(12) United States Patent
Kubo et al.

(10) Patent No.: US 9,531,248 B2
(45) Date of Patent: Dec. 27, 2016

(54) NON-CONTACT POWER TRANSMISSION APPARATUS

(71) Applicant: EMERGY CORPORATION, Osaka-shi, Osaka (JP)

(72) Inventors: Tetsuo Kubo, Osaka (JP); Tomofumi Shibata, Hitachinaka (JP); Takashi Tsukahara, Utsunomiya (JP); Tatsutaro Demura, Kanazawa (JP)

(73) Assignee: EMERGY CORPORATION, Osaka (JP)

( * ) Notice: Subject to any disclaimer, the term of this patent is extended or adjusted under 35 U.S.C. 154(b) by 166 days.

(21) Appl. No.: 14/456,273

(22) Filed: Aug. 11, 2014

(65) Prior Publication Data

US 2015/0108863 A1  Apr. 23, 2015

(30) Foreign Application Priority Data

Oct. 23, 2013 (JP) ................................. 2013-220138

(51) Int. Cl.
*H02K 49/10* (2006.01)
*H02K 7/02* (2006.01)

(52) U.S. Cl.
CPC ............. *H02K 49/104* (2013.01); *H02K 7/025* (2013.01)

(58) Field of Classification Search
CPC .... H02K 49/104; H02K 7/025; H02K 49/106; H02K 49/108
USPC ............................................. 310/103, 92, 80
See application file for complete search history.

(56) References Cited

U.S. PATENT DOCUMENTS

| | | | |
|---|---|---|---|
| 2004/0080227 A1 | 4/2004 | Tung Kong et al. | |
| 2007/0284956 A1* | 12/2007 | Petrovich | H02K 7/06 310/80 |
| 2008/0090694 A1* | 4/2008 | Wise | H02K 49/106 476/11 |
| 2008/0217373 A1* | 9/2008 | Boffelli | H02K 49/104 227/113 |

(Continued)

FOREIGN PATENT DOCUMENTS

| | | |
|---|---|---|
| EP | 1 968 176 A1 | 9/2008 |
| JP | A-2010-209963 | 9/2010 |
| JP | A-2010-239796 | 10/2010 |

OTHER PUBLICATIONS

Nov. 25, 2015 extended Search Report issued in European Patent Application No. 14189029.3.

(Continued)

*Primary Examiner* — Terrance Kenerly
*Assistant Examiner* — Noli Manaloto
(74) *Attorney, Agent, or Firm* — Oliff PLC

(57) ABSTRACT

An aspect of the present invention has a first disk-shaped member coupled to a first rotating shaft to rotate and a first plate-shaped member having a surface perpendicular to a surface of the first disk-shaped member and holding a first magnet. Moreover, a second disk-shaped member provided so as to face the first disk-shaped member and coupled to a second rotating shaft to rotate, and a second plate-shaped member having a surface perpendicular to a surface of the second disk-shaped member and holding a second magnet are provided. A magnetic pole of the first magnet on a side facing the second magnet and a magnetic pole of the second magnet on a side facing the first magnet have the same pole.

8 Claims, 14 Drawing Sheets

(56) References Cited

U.S. PATENT DOCUMENTS

2012/0288729 A1\* 11/2012 De-Gale ................. F16J 12/00
428/603

OTHER PUBLICATIONS

Arai et al., "Development of Flywheel Test Equipment for Flywheel Energy Storage System with Cryo-cooled Superconducting Magnetic Bearings," *RTRI Report*, Mar. 2011, vol. 25, No. 3, pp. 41-46 (with abstract).

\* cited by examiner

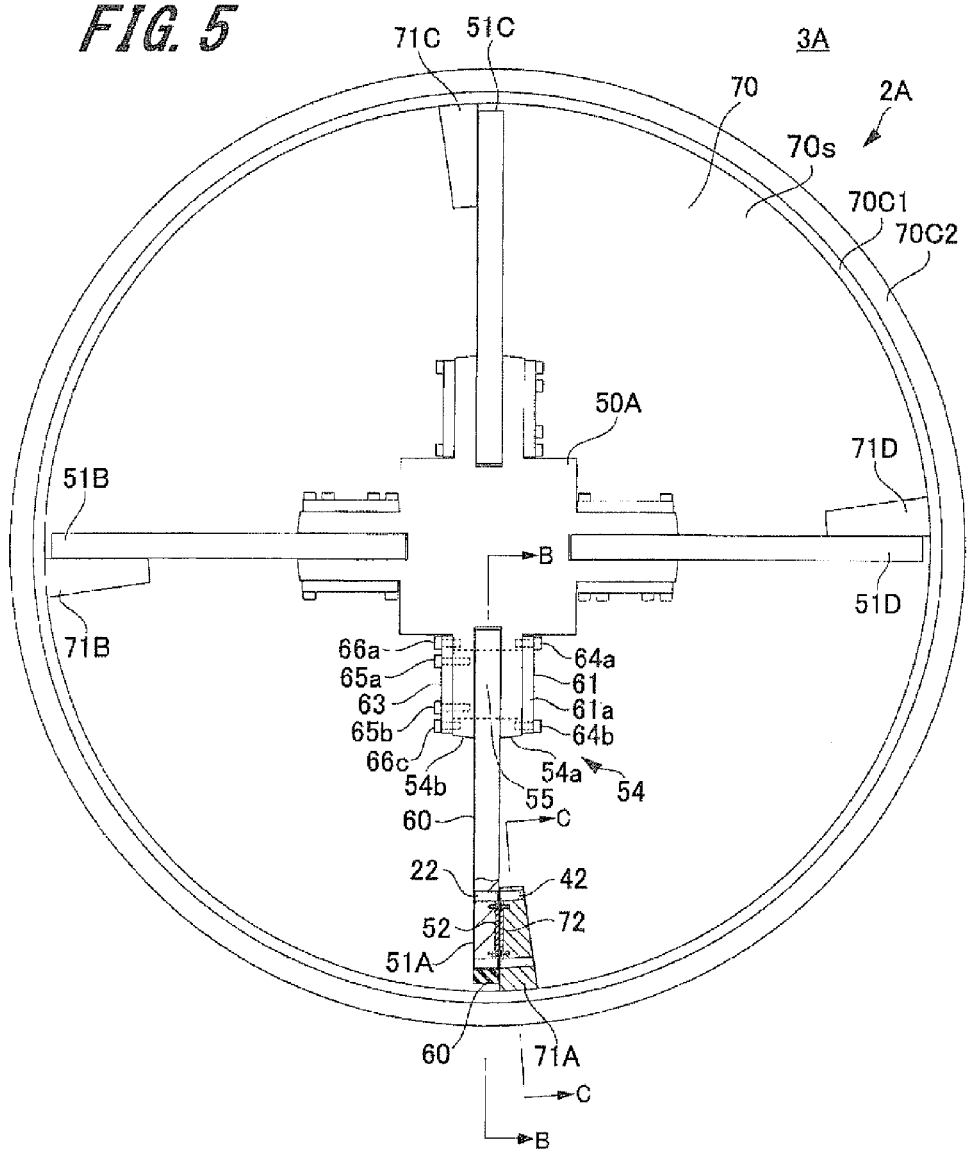

NON-CONTACT POWER TRANSMISSION APPARATUS

CROSS REFERENCES TO RELATED APPLICATIONS

The present invention contains subject matter related to Japanese Patent Applications JP 2013-220138, filed in the Japanese Patent Office on Oct. 23, 2013, respectively, the entire contents of which being incorporated herein by reference.

BACKGROUND OF THE INVENTION

Field of the Invention

The present invention relates to a non-contact power transmission apparatus using magnetism.

Description of the Related Art

A power storage apparatus has been known which converts electric power to kinetic energy of a rotating body (a flywheel, for example) and accumulates it and also converts the kinetic energy accumulated in the rotating body to electric energy and takes it out when necessary.

The power storage apparatus has a rotating body including a flywheel, a rotating shaft fixed to the flywheel, and a non-contact torque transmission component coupled to the rotating shaft arranged in an inner tank provided with a radiation shield tank and a vacuum container in the periphery thereof as illustrated in Patent Literature 1, for example. The rotating shaft of the rotating body is supported in a non-contact manner by a magnetic support device having a superconductor.

In the power storage apparatus constituted as above, the flywheel is placed in a high vacuum environment for conservation of energy and heat insulation, and the magnetic support device having the superconductor is used as a bearing of the rotating shaft so as to minimize friction resistance of the bearing.

In Non-Patent Literature 1, for example, there is described development of a freezer cooling type superconductive flywheel having a structure of supporting a large load in a non-contact manner by applying a superconductive magnetic bearing combining a superconductive coil and a superconductive bulk body to a flywheel. In the structure using the superconductive magnetic bearing for a flywheel, the superconductive coil is cooled to a critical temperature or below by conductive cooling using a refrigerating machine.

As a non-contact torque transmission component for transmitting power (rotary torque) to such flywheel, a magnetic coupling clutch device (hereinafter referred to as a "magnetic clutch") is used which transmits a torque of a rotating shaft between an inside and an outside of a vacuum container formed of a non-magnetic plate as disclosed in Patent Literature 2, for example.

The magnetic clutch is a non-contact power transmission apparatus for transmitting power (rotary torque) in a non-contact manner between a driving shaft connected to a motor generator and a driven shaft. In general, the magnetic clutch includes a first clutch portion having a surface perpendicular to the driving shaft, provided with a permanent magnetic body or a coil (a copper wire, for example), and coupled to the driving shaft and a second clutch portion having a surface perpendicular to the driven shaft, provided with a permanent magnetic body generating a magnetic force between the first clutch portion and the second clutch portion, and coupled to the driven shaft. In the magnetic clutch, the first clutch portion and the second clutch portion face each other so that a gap portion is formed between the first clutch portion and the second clutch portion, and the non-magnetic plate of the vacuum container is interposed in the gap portion. That is, the first clutch portion is arranged outside the vacuum container, and the second clutch portion is arranged inside the vacuum container.

The first clutch portion and the second clutch portion attract each other by a magnetic force generated between the first clutch portion and the second clutch portion, and power on the driving side is transmitted to the driven side by rotation of the second clutch portion in conjunction with rotation of the first clutch portion.

CITATION LIST

Patent Literature

Patent literature 1: Japanese Patent Laid-Open No. 2010-239796
Patent literature 2: Japanese Patent Laid-Open No. 2010-209963

Non-Patent Literature

Non-Patent Literature 1: Yuki Arai et al.: "Development of freezer cooling type superconductive flywheel testing device", Report by Railway Technical Res. Inst., Vol. 25, No. 3, pp 41 to 46, March 2011

SUMMARY OF THE INVENTION

In the power storage apparatus having the non-contact torque transmission component using the magnetic clutch as described above, the weight of the flywheel is several tons (2 tons, for example), and the weight of the entire apparatus including the vacuum container storing the flywheel amounts to several tens of tons. Thus, a large magnetic flux density should be generated between the first clutch portion and the second clutch portion of the magnetic clutch so as to strengthen magnetic coupling, but the sizes of the permanent magnetic bodies attached to the first clutch portion and the second clutch portion increase, and the weight of the magnetic clutch becomes extremely large. If the weight of the magnetic clutch increases, the magnetic clutch needs to be handled with great care, and a work of assembling the magnetic clutch in the power storage apparatus becomes difficult.

In view of the above described circumstances, a non-contact power transmission apparatus which transmits power from the driving side to the driven side in a non-contact manner without using a large-sized magnet has been in demand.

A non-contact power transmission apparatus according to one aspect of the present invention includes a first member on a driving side and a second member on a driven side.

The first member has a first disk-shaped member coupled to a first rotating shaft to rotate, a first plate-shaped member provided on a surface on a side opposite to a surface to which the first rotating shaft of the first disk-shaped member is coupled and having a surface perpendicular to the surface of the first disk-shaped member, and a first magnet provided on the perpendicular surface of the first disk-shaped member.

The second member has a second disk-shaped member provided so as to face the first disk-shaped member and coupled to a second rotating shaft to rotate, a second plate-shaped member provided on a surface on a side opposite to a surface to which the second rotating shaft of the second disk-shaped member is coupled and having a surface perpendicular to the surface of the second disk-shaped member, and a second magnet provided on the perpendicular surface of the second disk-shaped member.

A magnetic pole of the first magnet on a side facing the second magnet and a magnetic pole of the second magnet on a side facing the first magnet have the same pole.

According to the above described configuration, when the first disk-shaped member rotates around the first rotating shaft and the first magnet provided on the first plate-shaped member and the second magnet provided on the second plate-shaped member come close to and face each other, a repulsion force is generated between the first magnet and the second magnet. As a result, a force in a tangential direction of a circle around the first rotating shaft which is a center of rotation of the first magnet acts on the second magnet. Therefore, the second disk-shaped member on which the second plate-shaped member for holding the second magnet is provided rotates, and the second rotating shaft coupled to the second disk-shaped member rotates.

According to at least one embodiment of the present invention, there is provided a non-contact power transmission apparatus for transmitting power from a driving side to a driven side in a non-contact manner without using a large-sized magnet.

BRIEF DESCRIPTION OF THE DRAWINGS

FIG. 5 is an outline plan view for explaining a non-contact power transmission apparatus according to a second embodiment of the present invention.

FIGS. 6A and 6B are explanatory views of a plate-shaped member for holding a magnet illustrated in FIG. 5, in which FIG. 6A is a B-B line arrow view of a first plate-shaped member, and FIG. 6B is a C-C line arrow view of a second plate-shaped member.

FIGS. 7A and 7B are explanatory views of the plate-shaped member and an annular reinforcing member illustrated in FIG. 5, respectively, in which FIG. 7A is a plan view of the first plate-shaped member, and FIG. 7B is a plan view of the annular reinforcing member.

FIGS. 14A and 14B are explanatory views of a first rotating member of the non-contact power transmission apparatus in FIG. 12, in which FIG. 14A is a semi-sectional view of an E-E line of the first rotating member, and FIG. 14B is a semi-sectional view of a D-D line of the first rotating member.

FIGS. 15A and 15B are explanatory views of a second rotating member of the non-contact power transmission apparatus in FIG. 12, in which FIG. 15A is a semi-sectional view of a G-G line of the second rotating member, and FIG. 15B is a side view of the second rotating member of FIG. 15A.

FIGS. 16A and 16B are explanatory views of the first rotating member and the second rotating member, respectively, in which FIG. 16A is an F-F line arrow view of the first rotating member, and FIG. 16B is an H-H line arrow view of the second rotating member.

DESCRIPTION OF THE PREFERRED EMBODIMENTS

Figure 1:
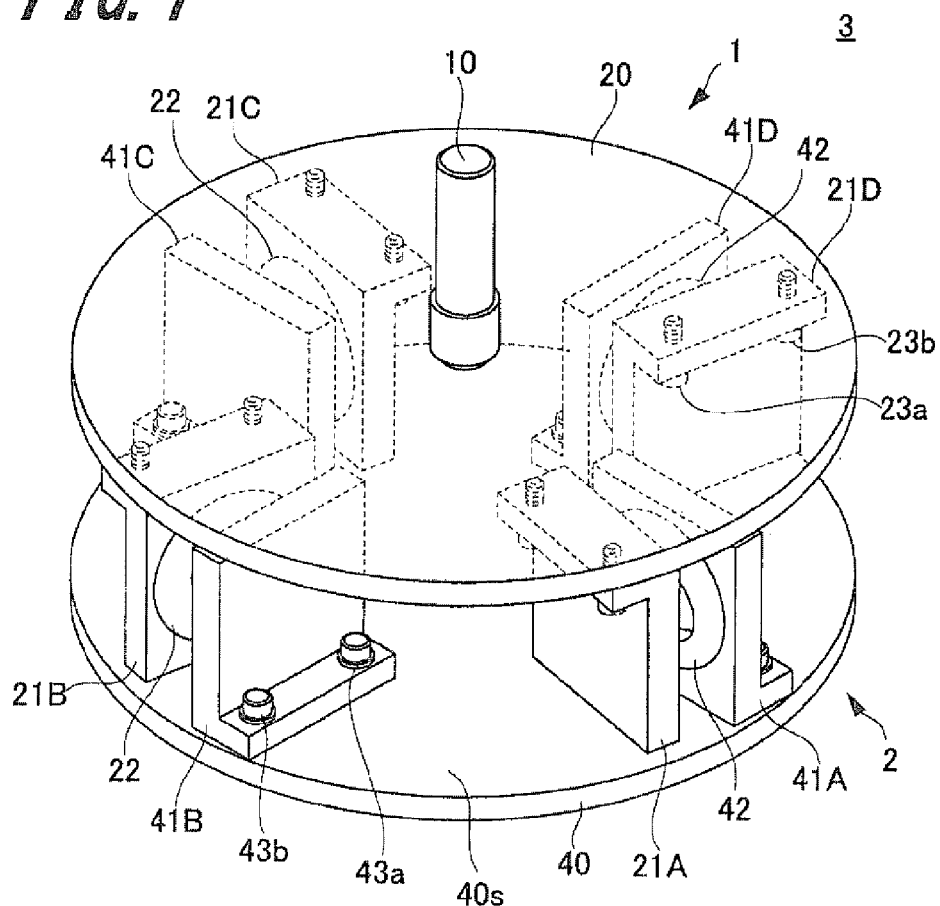
FIG. 1 is an outline perspective view illustrating an entire configuration of a non-contact power transmission apparatus according to a first embodiment of the present invention.

Embodiments of the present invention will be explained below by referring to the attached drawings. In each figure, the same reference numerals are given to common constituent elements, and duplicated explanation will be omitted.

1. First Embodiment

In a first embodiment, an example in which a magnetic clutch is applied as a non-contact power transmission apparatus will be explained.

FIG. 1 is an outline perspective view illustrating an entire configuration of a non-contact power transmission apparatus 3 according to the first embodiment of the present invention.

The non-contact power transmission apparatus 3 includes a first member 1 on a driving side and a second member 2 on a driven side. The first member 1 includes a first rotating shaft 10, a first disk-shaped member 20 (an example of a first rotating member), four first plate-shaped members 21A to 21D, and a first magnet 22 provided on each of the first plate-shaped members 21A to 21D.

One end portion of the first rotating shaft 10 is connected to a rotating shaft of an electric motor or a motor generator, not shown, directly or through a joint, while the other end portion of the first rotating shaft 10 is fixed to a center part of the first disk-shaped member 20. A shaft coupling or the like for transmitting power between the electric motor or the motor generator and the first member 1 is applied, for example, as a joint. The motor generator is a device in which an electric motor and a power generator are reversible and used for both purposes. If a flywheel is coupled to the second member 2 on the driven side, for example, the motor generator rotates the electric motor by electric energy so as to rotate the flywheel and rotates the power generator by kinetic energy of the fly wheel so as to generate electric power.

The first disk-shaped member 20 has a circular disk shape and is coupled to the other end portion of the first rotating shaft 10, and the first disk-shaped member 20 rotates with rotation of the first rotating shaft 10.

Each of the four first plate-shaped members 21A to 21D is fixed along a radiation direction around the first rotating shaft 10 on a main surface 20s (see FIG. 3) on a side opposite to a surface to which the first rotating shaft 10 of the first disk-shaped member 20 is coupled. In the example, the first plate-shaped members 21A to 21D are arranged at positions acquired by equally dividing the first disk-shaped member 20 into four parts, that is, at 90-degree intervals. Each of the four first plate-shaped members 21A to 21D has a surface perpendicular to the main surface 20s of the first disk-shaped member 20, and a first magnet 22 is provided on the perpendicular surface. When the four first plate-shaped members 21A to 21D are not particularly distinguished, they are referred to as "first plate-shaped members 21" in the following description.

On the other hand, the second member 2 has a configuration substantially similar to the first member 1. That is, the second member 2 includes a second rotating shaft 30 (see FIG. 3), a second disk-shaped member 40 (an example of a second rotating member), four second plate-shaped members 41A to 41D, and a second magnet 42 provided on each of the second plate-shaped members 41A to 41D.

One end portion of the second rotating shaft 30 is fixed at a center part of the second disk-shaped member 40, while the other end of the second rotating shaft 30 is connected to a rotating shaft of a flywheel or the like, not shown, directly or through a joint.

The second disk-shaped member 40 has a circular disk shape, is coupled to one end portion of the second rotating shaft 30, and is rotated following rotation of the first disk-shaped member 20, with which the second rotating shaft 30 rotates. The second disk-shaped member 40 is provided so as to face the first disk-shaped member 20.

Each of the four second plate-shaped members 41A to 41D is fixed along a radiation direction around the second rotating shaft 30 on a main surface 40s on a side opposite to a surface to which the second rotating shaft 30 of the second disk-shaped member 40 is coupled. In the example, the second plate-shaped members 41A to 41D are arranged at positions acquired by equally dividing the second disk-shaped member 40 into four parts, that is, at 90-degree intervals in correspondence with the positions of the first plate-shaped members 21A to 21D. Each of the four second plate-shaped members 41A to 41D has a surface perpendicular to the main surface 40s of the second disk-shaped member 40, and a second magnet 42 is provided on the perpendicular surface. When the four second plate-shaped members 41A to 41D are not particularly distinguished, they are referred to as "second plate-shaped members 41" in the following description.

Figure 2:
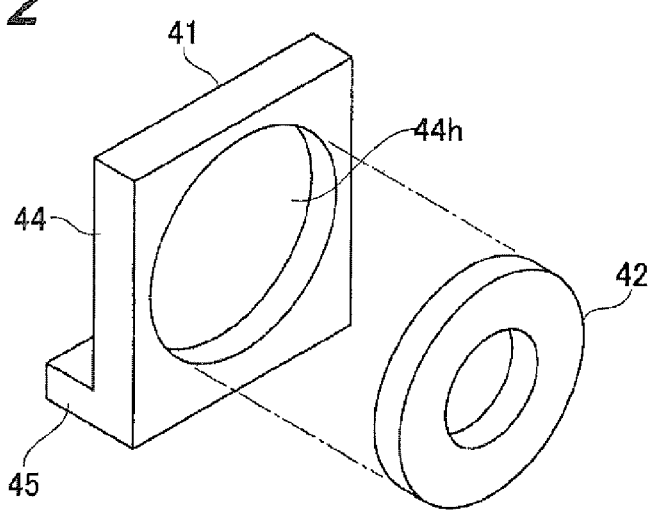
FIG. 2 is an explanatory view of a second plate-shaped member for holding a second magnet illustrated in FIG. 1.

Subsequently, the first plate-shaped member 21 and the second plate-shaped member 41 will be explained. Since the first plate-shaped member 21 and the second plate-shaped member 41 have the same configuration, the second plate-shaped member 41 will be explained here. FIG. 2 is an explanatory view of the second plate-shaped member 41 illustrated in FIG. 1.

As illustrated in FIG. 2, the second plate-shaped member 41 has an L-shape on a side view, composed of a perpendicular portion 44 having a surface perpendicular to the main surface 40s and a parallel portion 45 extending from an end portion of the perpendicular portion 44 and having a surface parallel with the main surface 40s in a state arranged on the second disk-shaped member 40. A circular hole portion 44h is formed on a surface of the perpendicular portion 44 on a side opposite to the surface on which the parallel portion 45 is formed. The second magnet 42 is fitted in the hole portion 44h formed on the perpendicular portion 44, and the second magnet 42 is secured to the perpendicular portion 44 by an adhesive. A through hole or a screw hole, not shown, is drilled in the parallel portion 45, and a screw hole is drilled in the main surface 40s. Then, a bottom surface of the parallel portion 45 of the second plate-shaped member 41 is fixed by screws 43a and 43b in contact with the main surface 40s of the second disk-shaped member 40.

The first plate-shaped member 21 also has the L-shape similar to the second plate-shaped member 41. A bottom surface of a parallel portion of the first plate-shaped member 21 on which the first magnet 22 is provided on a perpendicular portion corresponding to the perpendicular portion 44 is fixed by screws 23a and 23b to the main surface 20s of the first disk-shaped member 20.

In the non-contact power transmission apparatus 3, the magnetic pole of the first magnet 22 on a side facing the second magnet 42 and the magnetic pole of the second magnet 42 on a side facing the first magnet 22 are arranged so as to have the same pole. A permanent magnet is used as an example for the first magnet 22 and the second magnet 42. In FIGS. 1 and 2, the shapes of the first magnet 22 and the second magnet 42 are made annular, but this is not limiting and they may be circular, columnar, square or the like.

Figure 3:
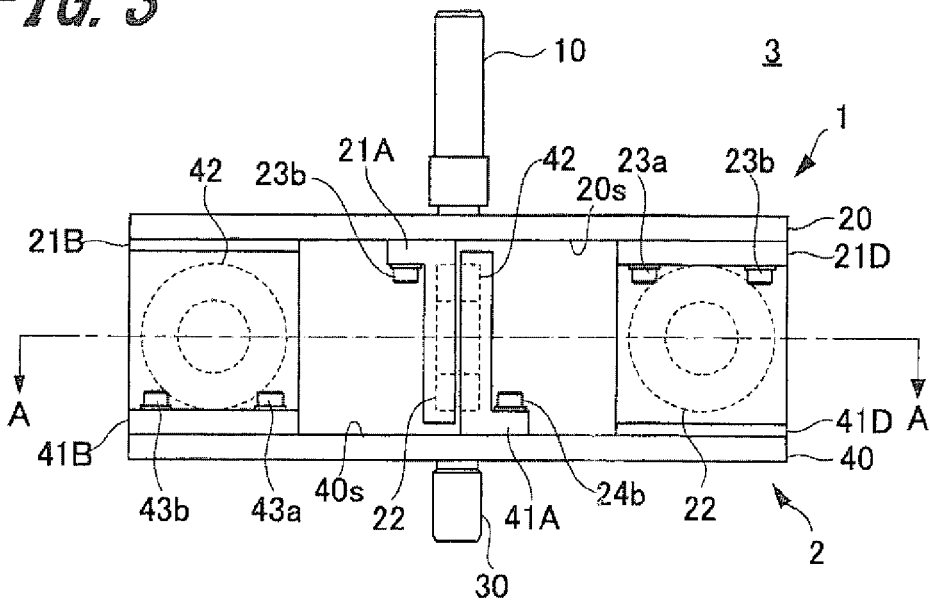
FIG. 3 is a side view of the non-contact power transmission apparatus according to the first embodiment of the present invention.
Figure 4:
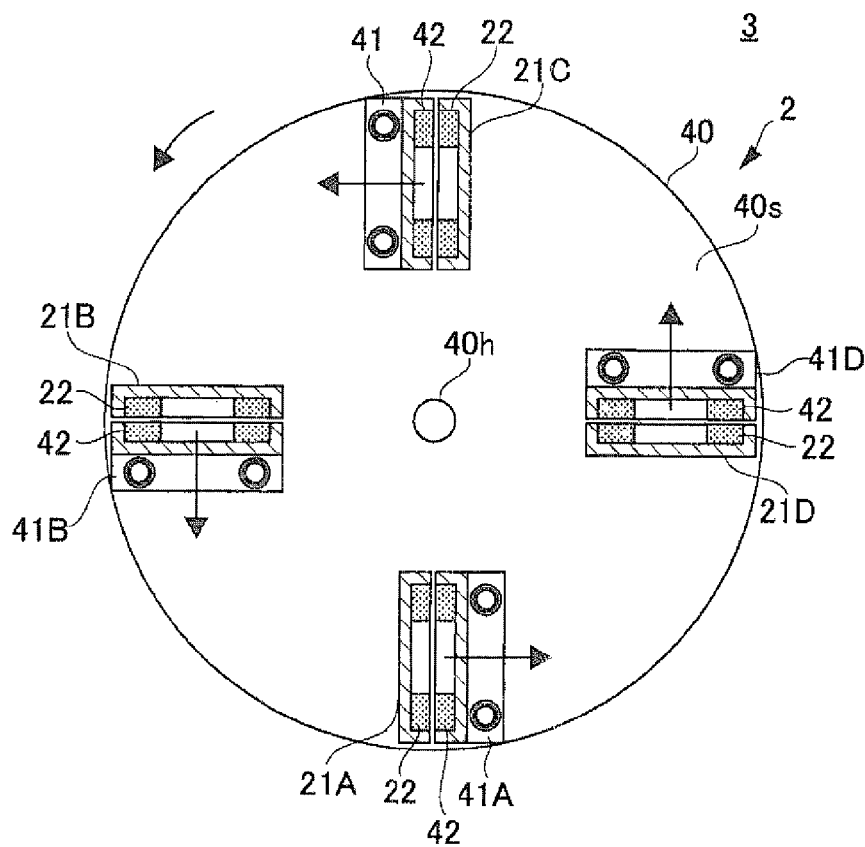
FIG. 4 is an A-A line arrow view of the non-contact power transmission apparatus according to the first embodiment of the present invention.

FIG. 3 is a side view of the non-contact power transmission apparatus 3. FIG. 3 illustrates a state in which the first disk-shaped member 20 is rotated so that the first plate-shaped members 21A to 21D (first magnet 22) of the first disk-shaped member 20 and the second plate-shaped members 41A to 41D (second magnet 42) of the second disk-shaped member 40 come close to each other. FIG. 4 is an A-A line arrow view of the non-contact power transmission apparatus 3 in FIG. 3.

As described above, in the state in which the first plate-shaped members 21A to 21D (first magnet 22) of the first member 1 and the second plate-shaped members 41A to 41D (second magnet 42) of the second member 2 come close to each other (FIGS. 3 and 4), the magnetic pole of the first magnet 22 on the side facing the second magnet 42 and the magnetic pole of the second magnet 42 on the side facing the first magnet 22 have the same pole. That is, S-poles or N-poles of the first magnet 22 and the second magnet 42 face each other. The hole 40h is a hole used for fixing the second rotating shaft 30 to the second disk-shaped member 40.

In such configuration, power (rotary torque) is given to the first rotating shaft 10 of the first member 1 so as to rotate the first disk-shaped member 20 in a counterclockwise direction (an arrow direction), for example. The first disk-shaped member 20 rotates around the first rotating shaft 10, and the first magnets 22 of the first plate-shaped members 21A to 21D come close to the corresponding second magnets 42 of the second plate-shaped members 41A to 41D (FIG. 4). When the first plate-shaped member 21 and the second plate-shaped member 41 come close to and face each other, it is so configured that the first magnet 22 held by the first plate-shaped member 21 and the facing surface of the second magnet 42 held by the second plate-shaped member 41 become substantially parallel.

At this time, a repulsion force is generated between the first magnet 22 and the second magnet 42. As a result, a force in a tangential direction of a circle around the first rotating shaft 10 which is the center of rotation of the first magnet 22 acts on the second magnet 42. Therefore, by means of the force in the tangential direction of the circle around the first rotating shaft 10 acting on the second magnet 42, a force in the same direction as the rotating direction of the first disk-shaped member 20 acts on the second disk-shaped member 40 on which the second plate-shaped member 41 holding the second magnet 42 is provided. As a result, the second rotating shaft 30 coupled to the second disk-shaped member 40 rotates. As described above, the power (rotary torque) of the first member 1 is transmitted to the second member 2 in a non-contact manner by using the repulsion force by magnetism.

According to the embodiment, the first rotating member (first disk-shaped member 20) attached to the first rotating shaft 10 (driving shaft) and the second rotating member (second disk-shaped member 40) attached to the second rotating shaft 30 (driven shaft) are joined in a non-contact manner. As a result, power is efficiently transmitted from the driving shaft to the driven shaft between the coupled first rotating member and second rotating member without generating friction or vibration.

The non-contact power transmission apparatus 3 according to the embodiment described above can transmit power in a non-contact manner from the driving side to the driven side with a simple configuration without using a large-sized magnet or a magnet with a large weight in order to enhance the magnetic force as before.

In the prior-art magnetic clutch, power is transmitted from the driving side to the driven side by using an attracting force (magnetic force) between a first clutch portion (magnet) and a second clutch portion (magnet) arranged facing each other in the rotating shaft direction, but the magnetic force becomes extremely large with the large-sized magnetic clutches. Thus, a gap portion between the first clutch portion and the second clutch portion needs to be made large, but if the gap portion is made large, a magnetic force generated between the first clutch portion and the second clutch portion is weakened, which is a problem. On the other hand, in the non-contact power transmission apparatus 3, the first magnet 22 and the second magnet 42 are not arranged facing each other in the rotating shaft direction and the repulsion force between the magnets is used and thus, power is efficiently transmitted from the driving side to the driven side. Thus, power can be transmitted from the driving side to the driven side in a non-contact manner without using a large-sized magnet.

In the above described non-contact power transmission apparatus 3, the first magnets 22 and the second magnets 42 are arranged on the first disk-shaped member 20 and the second disk-shaped member 40 at an interval of 90 degrees, respectively, but the example is not limiting. A magnetic flux generated in the non-contact power transmission apparatus 3 can be adjusted by changing the respective intervals between the first magnets 22 and the second magnets 42 and by increasing/decreasing the number of the first magnets 22 and the second magnets 42. Moreover, the magnetic flux or a magnetic flux density passing through the first magnets 22 and the second magnets 42 can be adjusted by changing shapes, areas or materials of the first magnets 22 and the second magnets 42. That is, a rotary torque can be adjusted by changing the numbers, shapes, areas or materials of the first magnets 22 and the second magnets 42. When adjustment is made so that the rotary torque transmitted from the first member 1 to the second member 2 becomes larger, the second rotating shaft 30 coupled to a large load can be rotated.

Moreover, the rotary torque can be adjusted also by changing the distance between the first magnets 22 provided on the first disk-shaped member 20 and the rotation center of the first disk-shaped member 20 and the distance between the second magnets 42 provided on the second disk-shaped member 40 and the rotation center of the second disk-shaped member 40.

Therefore, in the non-contact power transmission apparatus 3, power (rotary torque) transmitted from the driving side to the driven side can be easily adjusted. For example, by adjusting the rotary torque of the first member 1 to a large value, power can be transmitted in a non-contact manner from the driving side to the driven side coupled to a large load.

If the rotating shaft on the driving side and the rotating shaft on the driven side do not accord with each other, two universal joints for power transmission are used for coupling the rotating shaft on the driving side and the rotating shaft on the driven side so that the power is transmitted in the prior art, for example. That is, the power is transmitted through the joints, and the power cannot be directly transmitted from the driving side to the driven side. On the other hand, in the non-contact power transmission apparatus 3, it is only necessary that at least a part of the magnetic flux passing through the first magnets 22 passes through the second magnets 42 arranged so as to face the first magnets 22. Thus, in the non-contact power transmission apparatus 3, the power can be transmitted, even though the first rotating shaft 10 and the second rotating shaft 30 do not accord with each other, by arranging the first disk-shaped member 20 and the second disk-shaped member 40 so that at least a part of the magnetic flux passing through each of the first magnets 22 and the second magnets 42 overlaps each other. Moreover, since the power can be transmitted from the driving side to the driven side without going through the joint, a loss of power caused by use of the joint is eliminated, and power can be transmitted efficiently. Thus, power can be transmitted in a non-contact manner from the driving side to the driven side without using a large-sized magnet.

2. Second Embodiment

A non-contact power transmission apparatus according to a second embodiment will be explained below.

FIG. 5 is an outline plan view for explaining a non-contact power transmission apparatus 3A according to the second embodiment. FIG. 5 illustrates a state in which a first disk-shaped member, not shown, corresponding to the first disk-shaped member 20 is removed from a first member (corresponding to the first member 1), not shown, on the driving side constituting the non-contact power transmission apparatus 3A. In FIG. 5, a periphery of a spot on which the first magnet 22 of a first plate-shaped member 51A is provided and a periphery of a spot on which the second magnet 42 of a second plate-shaped member 71A is provided are illustrated on a sectional view.

A great difference between the non-contact power transmission apparatus 3A illustrated in FIG. 5 and the non-contact power transmission apparatus 3 (see FIGS. 1 to 4) according to the first embodiment is a structure of the first plate-shaped members 51A to 51D each holding the first magnet 22. The non-contact power transmission apparatus 3A has a structure in which a centrifugal force applied on the first plate-shaped members 51A to 51D each holding the first magnet 22 during the rotation of the first disk-shaped member, not shown, is considered.

The non-contact power transmission apparatus 3A includes the first member on the driving side, not shown, and a second member 2A on the driven side similarly to the non-contact power transmission apparatus 3 according to the first embodiment. The first member includes the first rotating shaft 10, the first disk-shaped member, not shown, which has the shape similar to that of the first disk-shaped member 20 and to which the first rotating shaft 10 is coupled, the four first plate-shaped members 51A to 51D, and the first magnets 22 provided on each of the first plate-shaped members 51A to 51D.

As illustrated in FIG. 5, a support portion main body 50A is provided at a center part of a main surface of the first disk-shaped member, not shown, corresponding to the main surface 20s of the first disk-shaped member 20. This support portion main body 50A supports the four first plate-shaped members 51A to 51D each holding the first magnet 22. In the example in FIG. 5, peripheries of end portions of the first plate-shaped members 51A to 51D on a side closer to the rotation center of the non-contact power transmission apparatus 3A are coupled to the support portion main body 50A. The first plate-shaped members 51A to 51D are arranged along a radiation direction around the first rotating shaft 10.

On the other hand, the second member 2A includes the second rotating shaft 30, a second disk-shaped member 70 to which the second rotating shaft 30 is coupled, the four second plate-shaped members 71A to 71D, and the second magnet 22 provided on each of the second plate-shaped members 71A to 71D.

The second member 2A has a first cylindrical portion 70C1 and a second cylindrical portion 70C2 provided so as to extend from a main surface 70s in a perpendicular direction in the vicinity of an outer peripheral portion of the main surface 70s of the second disk-shaped member 70. The four second plate-shaped members 71A to 71D are fixed to the main surface 70s of the second disk-shaped member 70 and an inner peripheral surface of the first cylindrical portion 70C1, respectively. The four second plate-shaped members 71A to 71D are arranged along the radiation direction around the second rotating shaft 30. A centrifugal force applied on the second plate-shaped members 71A to 71D can be resisted by fixing end portions on the outer periphery side of the second plate-shaped members 71A to 71D to the inner peripheral surface of the first cylindrical portion 70C1.

Moreover, the second cylindrical portion 70C2 is arranged on the outside of the first cylindrical portion 70C1. The outer peripheral surface of the first cylindrical portion 70C1 is in close contact with the inner peripheral surface of the second cylindrical portion 70C2. A resistance force against the centrifugal force applied on the second plate member 71 can be reinforced, and the resistance force against the centrifugal force applied on the second plate-shaped member 71 can be ensured more reliably by assisting the first, cylindrical portion 70C1 by using the second cylindrical portion 70C2. Metal such as stainless steel is used for the first cylindrical portion 70C1 as an example, since the second plate-shaped member 71 is fixed thereto, and a light-weighted and high-strength material such as a carbon fiber is used for the second cylindrical portion 70C2.

The first magnets 22 are arranged on the first plate-shaped members 51A to 51D on the sides far from the first rotating shaft 10. When the first disk-shaped member, not shown, of the non-contact power transmission apparatus 3A rotates, the first magnets 22 held by the first plate-shaped members 51A to 51D and the second magnets 42 held by the second plate-shaped members 71A to 71D come close to and face each other.

Figure 6A:
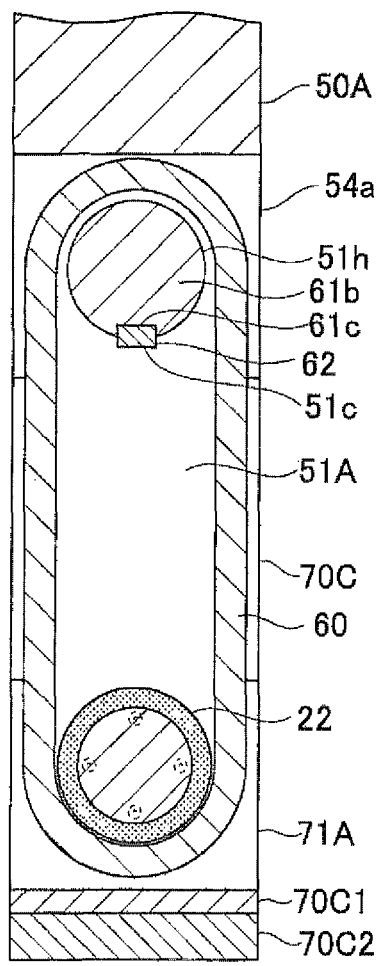
Figure 6B:
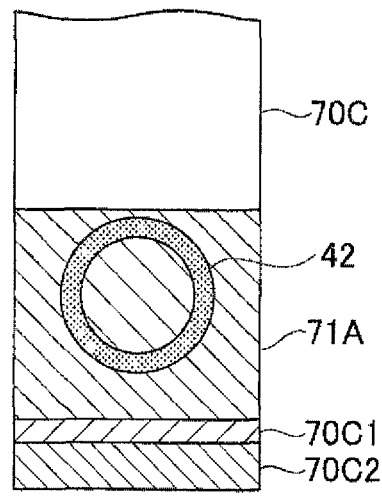

FIGS. 6A and 6B are explanatory views of the plate-shaped member holding the magnet, in which FIG. 6A is a B-B line arrow view of the first plate-shaped member 51A, and FIG. 6B is a C-C line arrow view of the second plate-shaped member 71A.

Figure 7A:
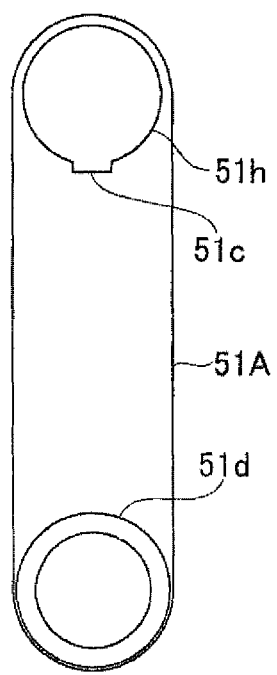
Figure 7B:
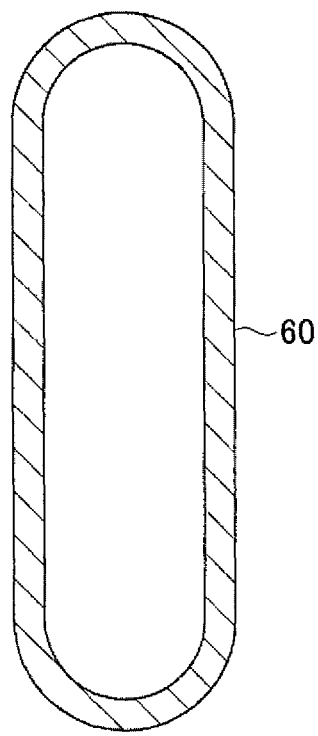

FIGS. 7A and 7B are explanatory views of the first plate-shaped member 51A and an annular reinforcing member 60, respectively, in which FIG. 7A is a plan view of the first plate-shaped member 51A, and FIG. 7B is a plan view of the annular reinforcing member 60.

Figure 8:
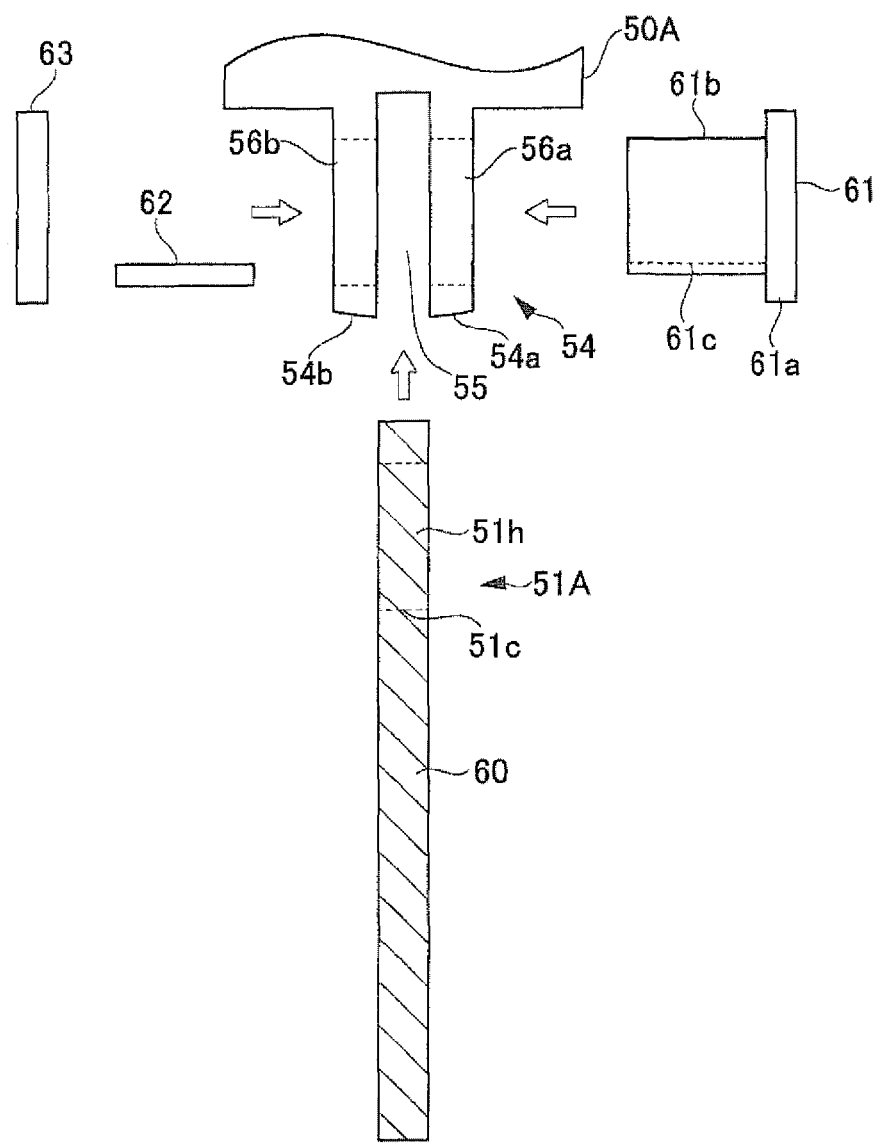
FIG. 8 is an exploded view of a support portion main body and the first plate-shaped member illustrated in FIG. 5.

FIG. 8 is an exploded view of a support portion 54 of the support portion main body 50A and the first plate-shaped member 51A.

Since the first plate-shaped members 51A to 51D have the same configuration, the first plate-shaped member 51A will be explained below as an example.

As illustrated in FIGS. 6A and 7A, a front view of the first plate-shaped member 51A is an oval or elliptic shape, and a through hole 51h is formed perpendicularly (or more accurately, at a twisted position) to the first rotating shaft 10. An insertion portion 61b (see FIG. 8) of a fixing member 61 is inserted into the through hole 51h. Moreover, an annular groove 51d into which the first magnet 22 is fitted is formed on the first plate-shaped member 51A on the side farther from the first rotating shaft 10 than the through hole 51h. In a state in which the insertion portion 61b provided on the support portion 54 of the support portion main body 50A is inserted into the through hole 51h of the first plate-shaped member 51A, the endless annular reinforcing member 60 made of a composite material in which at least carbon fiber, glass fiber or para-based wholly aromatic polyamide fiber (Kevlar (registered trademark), for example), are consolidated by a resin is wound around an outer periphery of the first plate-shaped member 51A. In the embodiment, the annular reinforcing member 60 is secured to the first plate-shaped member 51A by using an adhesive.

The endless annular reinforcing member 60 may be formed of a composite material of a material obtained by mixing two or more of the above described carbon fiber, glass fiber or para-based wholly aromatic polyamide fiber and a resin as another example. Alternatively, a material of at least one or more of the exemplified three materials and a material other than the three materials may be mixed.

Moreover, a groove 51c is formed on a part of the through hole 51h along an axial direction of the through hole 51h, and a groove 61c is formed along the axial direction of the insertion portion 61b. In a state in which the insertion portion 61b of the support portion 54 is inserted into the through hole 51h of the first plate-shaped member 51A, into a space portion formed by the groove 51c of the through hole 51h and the groove 61c of the insertion portion 61b, a rotation preventing member 62 having a shape corresponding to the space portion is inserted. As a result, rotational movement of the first plate-shaped member 51A around the insertion portion 61b is prevented.

As illustrated in FIG. 8, the fixing member 61 has a locking portion 61a, the insertion portion 61b having a right cylindrical shape with a diameter smaller than an outside dimension of the locking portion 61a formed on one surface of the locking portion 61a, and the groove 61c. Moreover, a deep groove portion 55 is formed in the support portion 54 formed protruding from one side surface of the support portion main body 50A. The width of the groove portion 55 is substantially equal to the thickness of the first plate-shaped member 51A. Moreover, through holes 56a and 56b are formed perpendicularly (or more accurately, at a twisted position) to the first rotating shaft 10 on support members 54a and 54b, respectively, located on the both sides of the groove portion 55.

First, the side of the first plate-shaped member 51A around which the annular reinforcing member 60 is wound and having the through hole 51h formed is inserted into the groove portion 55 of the support portion 54 formed on the support portion main body 50A. Then, the insertion portion 61b of the fixing member 61 is inserted into the through hole 56a of the support member 54a, the through hole 51h of the first plate-shaped member 51A, and the through hole 56b of the support member 54b. Then, from the opposite side of the fixing member 61, the rotation preventing member 62 is inserted into the space portion formed by the groove 51c of the through hole 51h and the groove 61c of the insertion portion 61b. Subsequently, the locking portion 61a of the fixing member 61 is fixed to the support member 54a of the support portion 54 by screws 64a and 64b. Similarly, the fixing member 63 and the insertion portion 61b are fixed by screws 65a and 65b in a state in which the fixing member 63 is pressed onto the end portions of the support member 54b of the support portion 54 and the insertion portion 61b, and the fixing member 63 and the support member 54b are fixed by screws 66a and 66b.

According to the embodiment, it is configured such that the insertion portion 61b of the fixing member. 61 fixed to the support portion main body 50A is inserted into the through hole 51h of the first plate-shaped member 51 holding the first magnet 22, and the annular reinforcing member 60 is wound around the outer periphery of the first plate-shaped member 51. A resistance force against the centrifugal force applied on the first plate-shaped member 51 is ensured by supporting the first plate-shaped member 51 holding the first magnet 22 by using the insertion portion 61b having such a large diameter. Moreover, the resistance force against the centrifugal force applied on the first plate-shaped member 51 can be further reinforced and the resistance force against the centrifugal force applied on the first plate-shaped member 51 can be ensured more reliably by assisting the insertion portion 61b by using the annular reinforcing member 60.

In the embodiment, the rotation preventing member 62 is used, but the example is not limiting. For example, rotational movement of the first plate-shaped member 51A around the insertion portion 61b can be prevented by providing a projecting portion, corresponding to the groove 61c of the insertion portion 61b or the groove 51c of the through hole 51h on the through hole 51h of the first plate-shaped member 51A or the insertion portion 61b of the fixing, member 61 along the axial direction. Alternatively, the sectional shape of the insertion portion 61b may be formed having a polygonal shape and the through hole 51h may be formed having a shape corresponding to the polygon instead of provision of the above described projecting portion on the groove 61c of the insertion portion 61b or the groove 51c of the through hole 51h.

Figure 9:
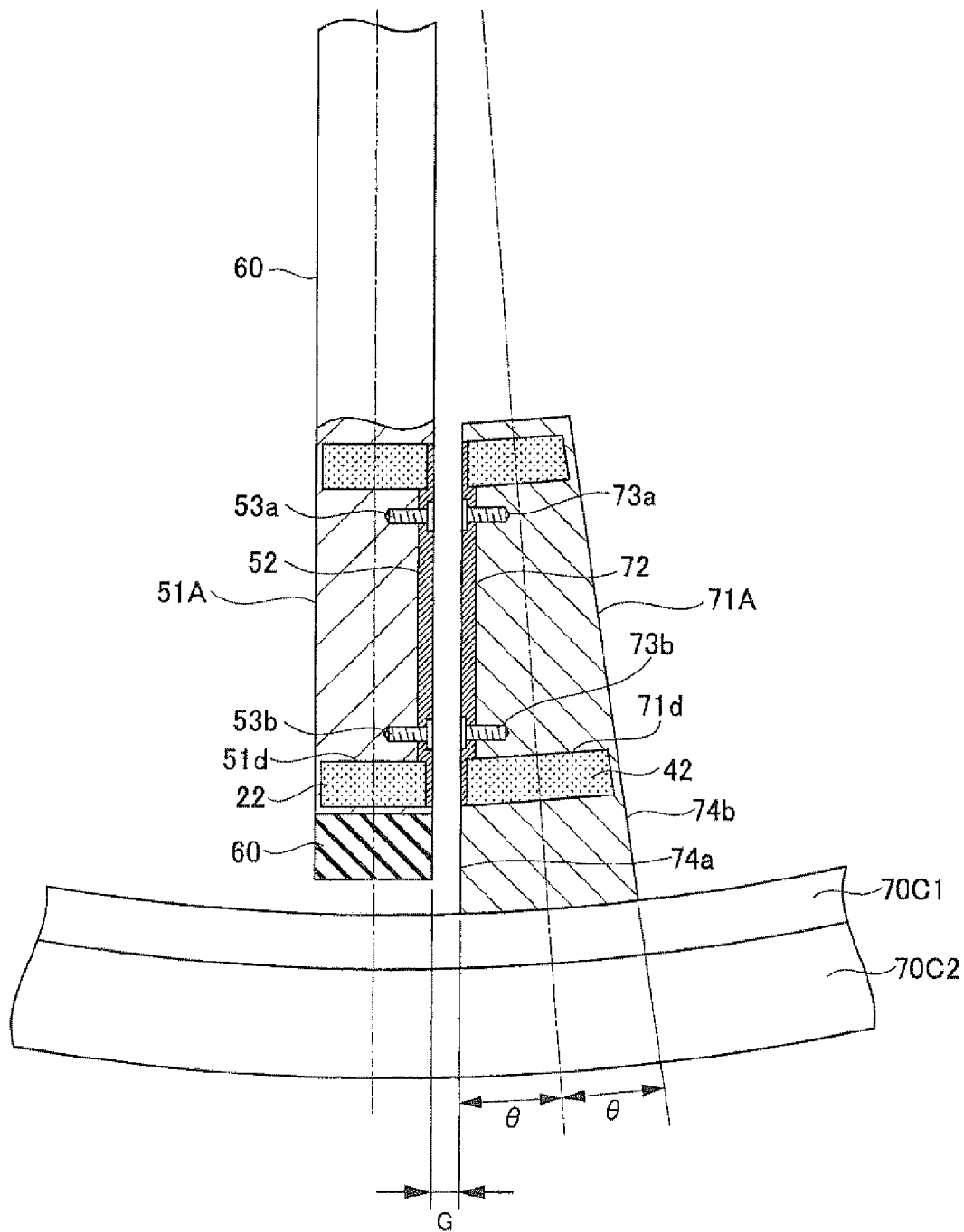
FIG. 9 is an enlarged view of an essential part of the first plate-shaped member and the second plate-shaped member illustrated in FIG. 5.

FIG. 9 is an enlarged view of an essential part of the first plate-shaped member 51A and the second plate-shaped member 71A.

A taper is formed on the second plate-shaped member 71A so that, when the first magnet 22 and the second magnet 42 come close to and face each other, the surface of the first magnet 22 facing the second magnet 42 and the surface of the second magnet 42 facing the first magnet 22 become parallel. In the example in FIG. 9, the taper with an angle θ is formed on the surface of the second plate-shaped member 71A facing the first plate-shaped member 51A and the surface on the side opposite to that, respectively. As a result, the width of the second plate-shaped member 71A in a direction perpendicular to the diameter thereof becomes smaller as it gets closer to the second rotating shaft 30 (see FIG. 3).

A lid 52 covers the first magnet 22 fitted in the annular groove 51d of the first plate-shaped member 51A from above. A lid 72 covers the second magnet 42 fitted in the annular groove 71d of the second plate-shaped member 71A from above.

As described above, by forming the taper on the second plate-shaped member 71A, the surface of the first magnet 22 face the second magnet 42 and the surface of the second magnet 42 facing the first magnet 22 become parallel with each other when the first magnet 22 and the second magnet 42 come close to and face each other. Moreover, by forming the taper on the both surfaces of the second plate-shaped member 71A, even if the first disk-shaped member, not shown, rotates clockwise or counterclockwise, the surface of the first magnet 22 facing the second magnet 42 and the surface of the second magnet 42 facing the first magnet 22 become parallel with each other when the first magnet 22 and the second magnet 42 come close to and face each other.

If the first disk-shaped member, not shown, is configured rotatable both clockwise and counterclockwise, the lid 52 and the lid 72, for example, or moreover the first plate-shaped member 51 and the second plate-shaped member 71 may be formed of a non-magnetic material.

3. Third Embodiment

A non-contact power transmission apparatus according to a third embodiment will be explained below.

Figure 10:
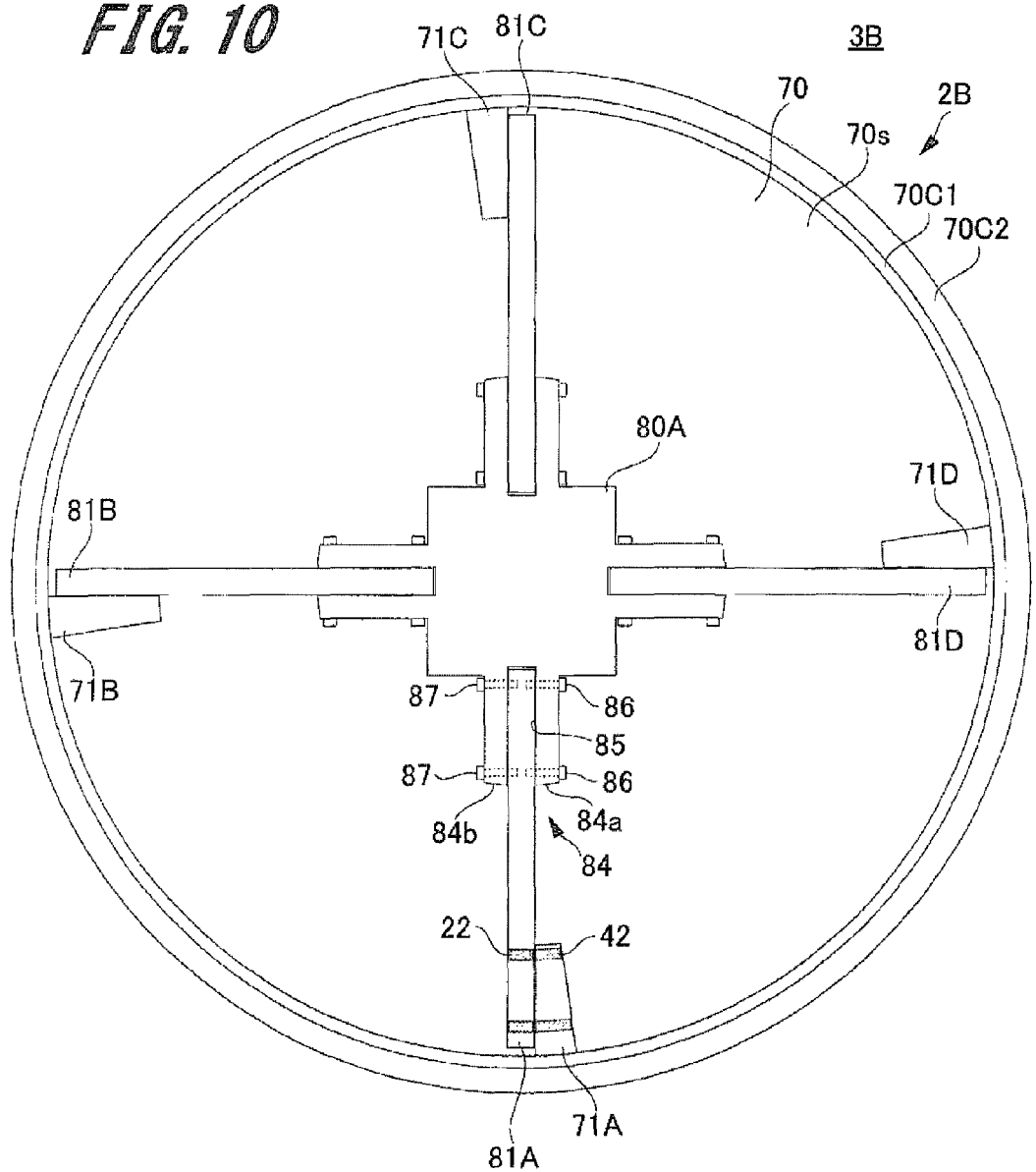
FIG. 10 is an outline plan view for explaining a non-contact power transmission apparatus according to a third embodiment of the present invention.

FIG. 10 is an outline plan view for explaining a non-contact power transmission apparatus 3B.

Figure 11:
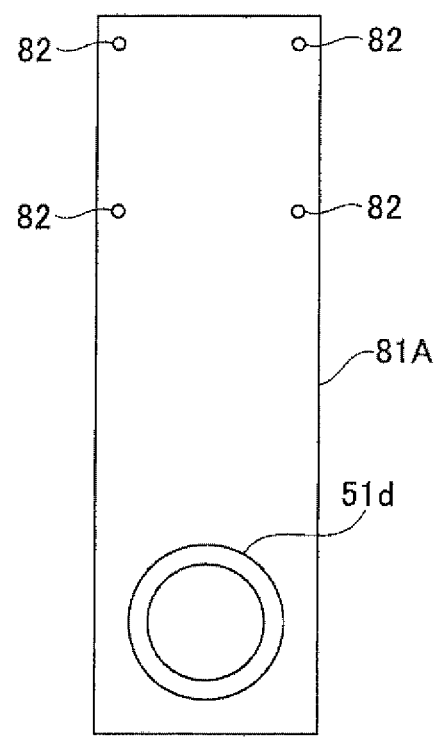
FIG. 11 is a plan view of a first plate-shaped member illustrated in FIG. 10.

FIG. 11 is a plan view of a first plate-shaped member 81A illustrated in FIG. 10.

The difference between the non-contact power transmission apparatus 3B illustrated in FIG. 10 and the non-contact power transmission apparatus 3A according to the second embodiment is means for supporting first plate-shaped members 81A to 81D each holding the first magnet 22 with a support portion main body 80A. The embodiment is configured such that the first plate-shaped members 81A to 81D are supported by the support portion main body 80A without using the annular reinforcing member 60.

The non-contact power transmission apparatus 3B includes a first member on the driving side, not shown, and a second member 2B on the driven side similarly to the non-contact power transmission apparatus 3A according to the second embodiment. The first member includes the first rotating shaft 10, the first disk-shaped member, not shown, which has a shape similar to that of the first disk-shaped member 20 and to which the first rotating shaft 10 is coupled, the four first plate-shaped members 81A to 81D, and the first magnet 22 provided on each of the first plate-shaped members 81A to 81D.

Moreover, as illustrated in FIG. 10, the support portion main body 80A is provided at a center part of a main surface of the first disk-shaped member, not shown, corresponding to the main surface 20s of the first disk-shaped member 20. The support portion main body 80A supports the four first plate-shaped members 81A to 81D each holding the first magnet 22. In the example in FIG. 10, vicinities of end portions of the first plate-shaped members 81A to 81D on a side closer to the rotation center of the non-contact power transmission apparatus 3B are coupled to the support portion main body 80A. The first plate-shaped members 81A to 81D are arranged along a radiation direction around the first rotating shaft 10. A deep groove portion 85 is formed in a support portion 84 formed protruding from one side surface of the support portion main body 80A. Moreover, a through hole of a screw hole, not shown, is formed perpendicularly to the first rotating shaft 10 in each of support members 84a and 84b located on the both sides of the groove portion 85.

Since the first plate-shaped members 81A to 81D have the same configuration, the first plate-shaped member 81A will be explained below as an example.

A front view of the first plate-shaped member 81A is a rectangle, and an annular groove 51d into which the first magnet 22 is fitted is formed on the first plate-shaped member 81A on the side far from the first rotating shaft 10. The shape of the first plate-shaped member 81A may be an oval or elliptic shape. Moreover, four screw holes 82, for example, are formed in a portion on the surface of the first plate-shaped member 81A closer to the support portion main body 80A. Similarly, the four screw holes 82 are formed also on the back surface. The first plate-shaped member 81A is fixed to the support member 84a of the support portion 84 by using a screw 86. Similarly, the first plate-shaped member 81A is fixed to the support member 84b of the support portion 84 by using a screw 87.

According to the embodiment, the first plate-shaped member 81A is fixed to the support portion main body 80A without using the annular reinforcing member 60 but by using the screws 86 and 87. As described above, the support portion main body 80A can support the first plate-shaped member 81A with a simple configuration.

4. Fourth Embodiment

It has been a general practice that power is transmitted by using, a rotating shaft of a motor or a rotating shaft of an engine as a driving shaft and by providing a driven shaft on an axis of the driving shaft. The driving shaft and driven shaft are coupled through rubber, a resin or metal attached to a member called a hub. As a generally used component for coupling, rubber, resin coupling, metal coupling and the like are known.

As described above, the rubber, resin or metal is generally provided as the component for coupling (power transmission medium) between the hub attached to the driving shaft and the hub attached to the driven shaft. However, the axes of the driven shaft and the driving shaft might be parallel and shifted or the driving shaft and the driven shaft might be shifted with an angle at a coupled portion between a member on the driving side and a member on the driven side in power transmission. In such a case, a power loss, vibration or the like caused by twisting, friction and the like is generated at the portion where the hub and the power transmission medium are attached, and the power of the driving shaft cannot be efficiently transmitted to the driven side.

Thus, as a fourth embodiment, a configuration in which a magnet is attached to each of the hubs on the driving shaft side and the driven shaft side is exemplified as a method of not interposing rubber, resin or metal when power is transmitted from the driving side to the driven side. Similarly to the first to third embodiments, the poles of the facing magnets attached to the driving shaft side and the driven shaft side are made the same pole, and a repulsion force of the magnetic force is used. The repulsion force works as a medium for transmitting power from the driving side to the driven side instead of the rubber, resin or metal in the prior art.

[Configuration of Non-Contact Power Transmission Apparatus]

A configuration of the non-contact power transmission apparatus according to the embodiment will be explained below.

Figure 12:
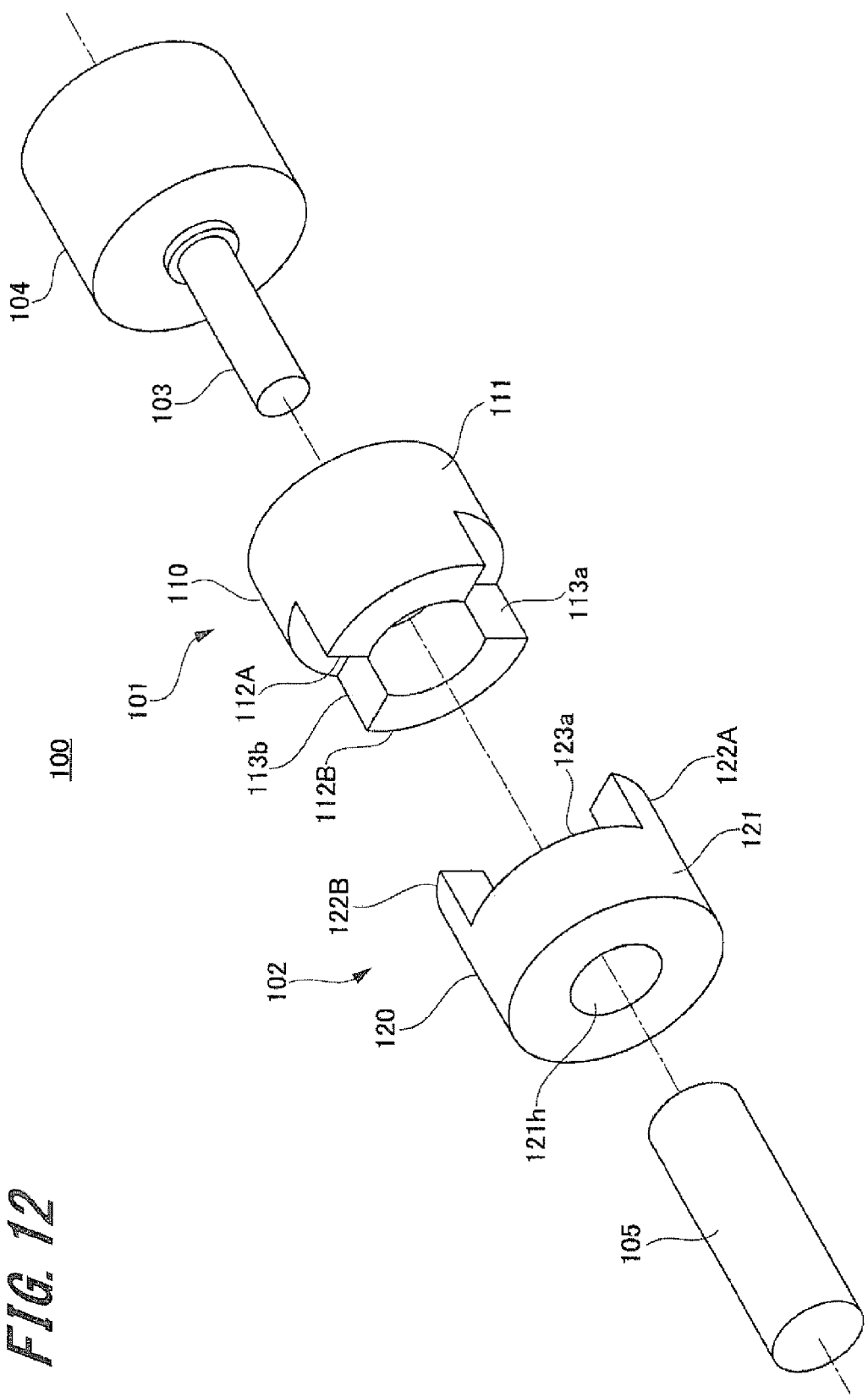
FIG. 12 is an exploded perspective view of a non-contact power transmission apparatus according to a fourth embodiment of the present invention.

FIG. 12 is an exploded perspective view of the non-contact power transmission apparatus 100 according to the embodiment.

Figure 13:
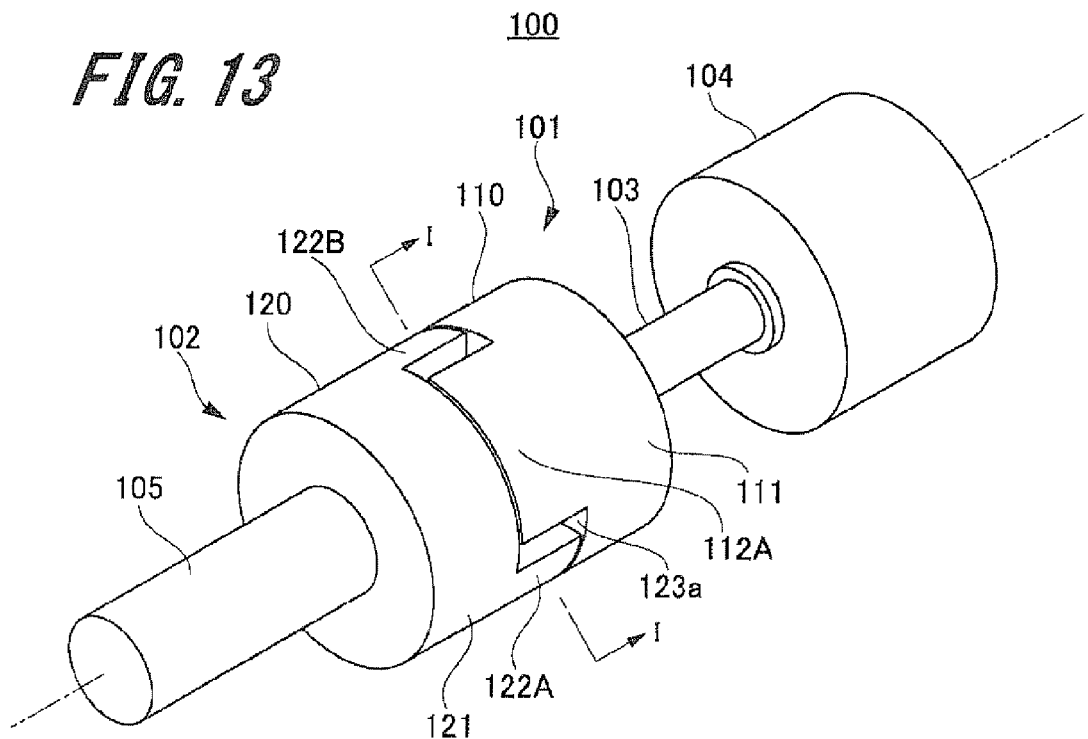
FIG. 13 is a perspective view of a state in which the non-contact power transmission apparatus in FIG. 12 is assembled.

FIG. 13 is a perspective view of a state in which the non-contact power transmission apparatus 100 in FIG. 12 is assembled.

The non-contact power transmission apparatus 100 illustrated in FIGS. 12 and 13 includes a first member 101 on the driving side and a second member 102 on the driven side.

(Configuration of First Member)

The first member 101 includes a first rotating shaft 103, a first rotating member 110, and first magnets 115a to 115d (see FIG. 16A) which will be described later and accommodated in the first rotating member 110.

One end portion of the first rotating shaft 103 is connected to a rotating shaft of an electric motor 104, for example, and the other end portion of the first rotating shaft 103 is fixed to a center part of the first rotating member 110. When the electric motor 104 is driven and the first rotating shaft 103 rotates, the first rotating member 110 rotates with the first rotating shaft 103.

The first rotating member 110 includes a disk-shaped or columnar first rotating member main body 111. First holding portions 112A and 112B are projected in a direction parallel with the first rotating shaft 103 on a surface 111s (see FIG. 16A) of the first rotating member main body 111 facing a second rotating member 120. Moreover, the first holding portions 112A and 112B are formed so as to follow the outer periphery of a surface of the first rotating member main body 111 facing the second rotating member 120. Furthermore, the first holding portions 112A and 112B are arranged at an interval of 180 degrees and face each other. Gap portions 113a and 113b are formed between the first holding portions 112A and 112B.

Figure 14A:
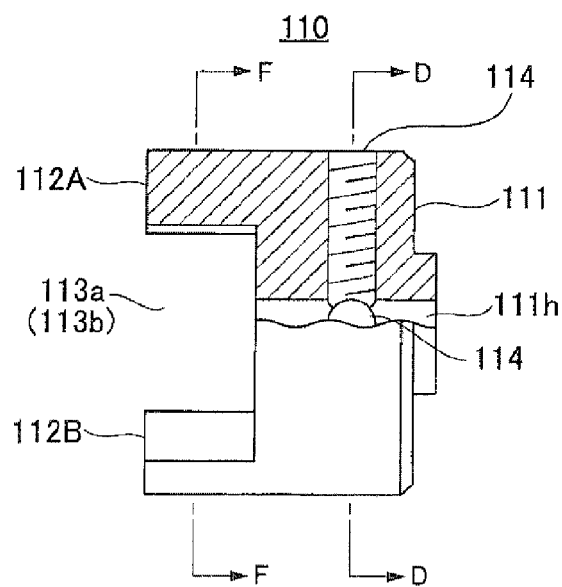
Figure 14B:
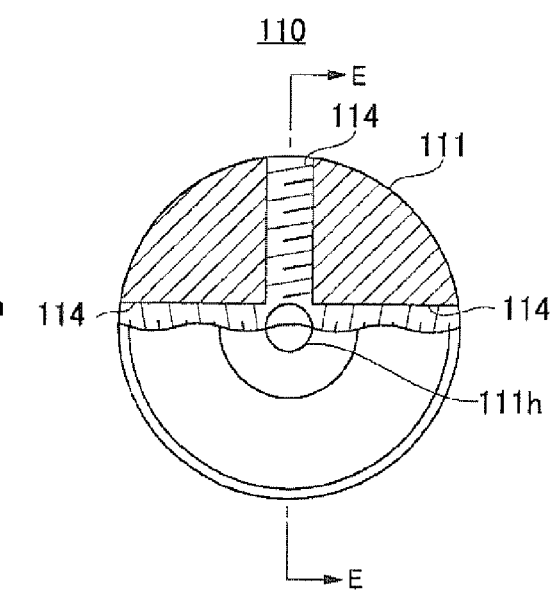

FIGS. 14A and 14B are explanatory views of the first rotating member 110 of the non-contact power transmission apparatus 100, in which FIG. 14A is a semi-sectional view of an E-E line of the first rotating member 110, and FIG. 14B is a semi-sectional view of a D-D line of the first rotating member 110.

A shaft hole 111h through which the first rotating shaft 103 is passed is formed in the first rotating member main body 111. Moreover, four screw holes 114 are formed at an interval of 90 degrees in the first rotating member main body 111. The four screw holes 114 are formed from an outer peripheral surface of the first rotating member main body 111 toward the shaft hole 111h and are connected to the shaft hole 111h. A screw is screwed in each of the four screw holes 114 in a state in which the first rotating shaft 103 is inserted into the shaft hole 111h of the first rotating member main body 111. The first rotating shaft 103 is fixed to the first rotating member main body 111 by bringing a tip end of each screw into contact with the first rotating shaft 103 and by locking the first rotating shaft 103.

(Configuration of Second Member)

The second member 102 includes a second rotating shaft 105, the second rotating member 120, and second magnets 125a to 125d (see FIG. 16B) which will be described later and accommodated in the second rotating member 120.

One end portion of the second rotating shaft 105 is fixed to a center part of the second rotating member 120, while the other end portion of the second rotating shaft 105 is connected to an article, not shown, to which power is transmitted. When the electric motor 104 is driven and the first rotating shaft 103 rotates, the first rotating member 110 rotates with the first rotating shaft 103.

A basic configuration of the second rotating member 120 is the same as that of the first rotating member 110. The second rotating member 120 includes a disk-shaped or columnar second rotating member main body 121. Second holding portions 122A and 122B are projected in a direction parallel with the second rotating shaft 105 on a surface 121s (see FIG. 16A) of the second rotating member main body 121 facing the first rotating member 110. Moreover, the second holding portions 122A and 122B are formed so as to follow an outer periphery of a surface of the second rotating member main body 121 facing the first rotating member 110. Furthermore, the second holding portions 122A and 122B are arranged at an interval of 180 degrees and face each other. Gap portions 123a and 123b are formed between the second holding portions 122A and 122B.

Figure 15A:
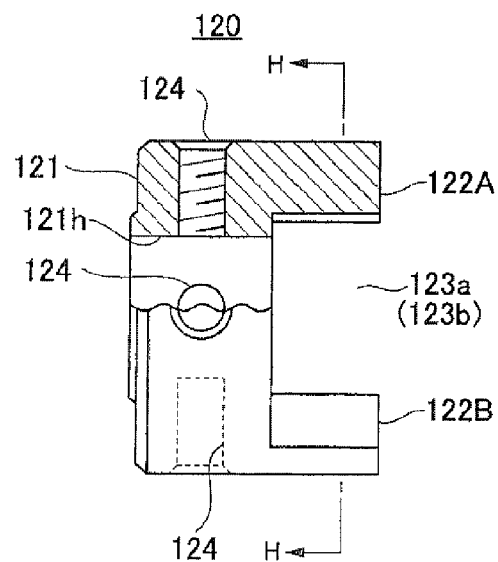
Figure 15B:
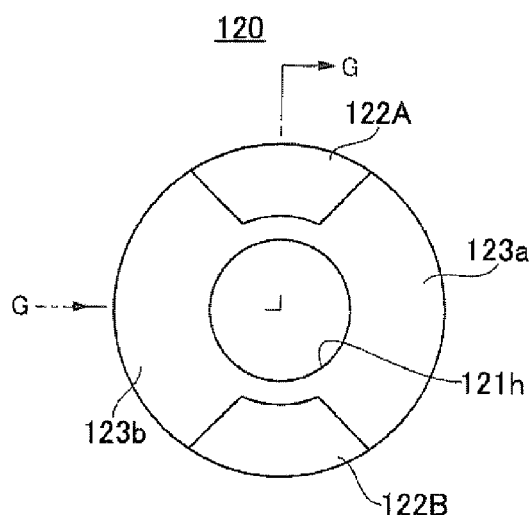

FIGS. 15A and 15B are explanatory views of the second rotating member 120 of the non-contact power transmission apparatus 100, in which FIG. 15A is a semi-sectional view of a G-G line of the second rotating member 120, and FIG. 15B is a side view of the second rotating member 120 in FIG. 15A.

A shaft hole 121h through which the second rotating shaft 105 is passed is formed in the second rotating member main body 121. Moreover, four screw holes 124 are formed at an interval of 90 degrees in the second rotating member main body 121. The four screw holes 124 are formed from an outer peripheral surface of the second rotating member main body 121 toward the shaft hole 121h and are connected to the shaft hole 121h. A screw is screwed in each of the four screw holes 124 in a state in which the second rotating shaft 105 is inserted into the shaft hole 121h of the second rotating member main body 121. The second rotating shaft 105 is fixed to the second rotating member main body 121 by locking the second rotating shaft 105 by each screw.

Means for fixing the first rotating member 110 to the first rotating shaft 103 and the second rotating member 120 to the second rotating shaft 105 are not limited to the examples illustrated in FIGS. 14A, 14B, 15A and 15B, and various known technologies can be used.

When the first holding portions 112A and 112B of the first rotating member 110 are inserted into the gap portions 123a and 123b of the second rotating member 120, and the second holding portions 122A and 122B of the second rotating member 120 into the gap portions 113a and 113b of the first rotating member 110, the first rotating member 110 and the second rotating member 120 are combined. That is, the first member 101 and the second member 102 are coupled to each other (FIG. 13).

Figure 16A:
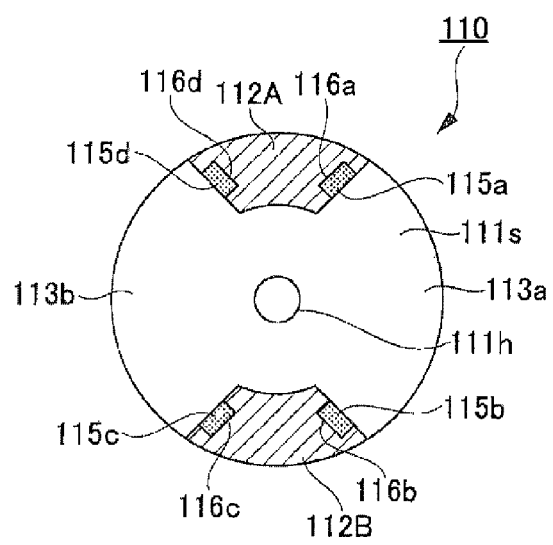
Figure 16B:
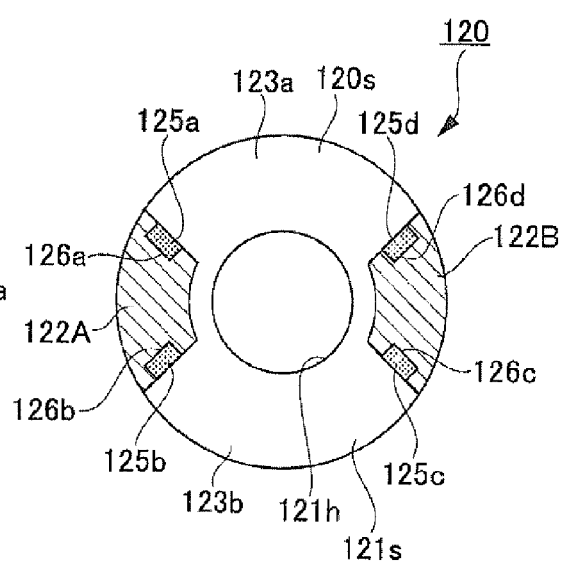

FIGS. 16A and 16B are explanatory views of the first rotating member 110 and the second rotating member 120, in which FIG. 16A is an F-F line arrow view of the first rotating member 110, and FIG. 16B is an H-H line arrow view of the second rotating member 120.

As illustrated in FIG. 16A, first magnets 115a and 115d are held by the first holding portion 112A of the first rotating member 110, and first magnets 115b and 115c are held by the first holding portion 112B. When the first magnets 115a to 115d are not distinguished, they are referred to as "first magnet 115" in the following.

Each of the first holding portions 112A and 112B has two surfaces perpendicular to the surface 111s of the first rotating member main body 111 and parallel in a radial direction. Hole portions 116a and 116d are formed in the two surfaces of the first holding portion 112A. Hole portions 116b and 116c are formed in the two surfaces of the first holding portion 112B. The first magnets 115a and 115d are fitted in the hole portions 116a and 116d provided in the first holding portion 112A, and the first magnets 115a and 115d are secured (held) by the first holding portion 112A by an adhesive. Similarly, the first magnets 115c and 115b are secured (held) by the first holding portion 112B by the adhesive. When the hole portions 116a to 116d are not distinguished, they are referred to as "hole portion 116" in the following.

On the other hand, as illustrated in FIG. 16B, the second magnets 123a and 125b are held by the second holding portion 122A of the second rotating member 120, while the second magnets 125d and 125c are held by the second holding portion 122B. The second rotating member 120 illustrated in FIG. 16B is in a state in which the second rotating member 120 in FIG. 15A is rotated to the left by 90 degrees for convenience of explanation. When the second magnets 125a to 125d are not distinguished, they are referred to as "second magnet 125" in the following.

Each of the second holding portions 122A and 122B has two surfaces perpendicular to the surface 121s of the second rotating member main body 121 and parallel in a radial direction. Hole portions 126a and 126b are formed in the two surfaces of the second holding portion 122A. Hole portions 126d, and 126c are formed in the two surfaces of the second holding portion 122B. The second magnets 125a and 125b are fitted in the hole portions 126a and 126b provided in the second holding portion 122A, and the second magnets 125a and 125b are secured (held) by the second holding portion 122A by an adhesive. Similarly, the second magnets 125d and 125c are secured (held) by the second holding portion 122B by the adhesive. When the hole portions 126a to 126d are not distinguished, they are referred to as "hole portion 126" in the following.

Figure 17:
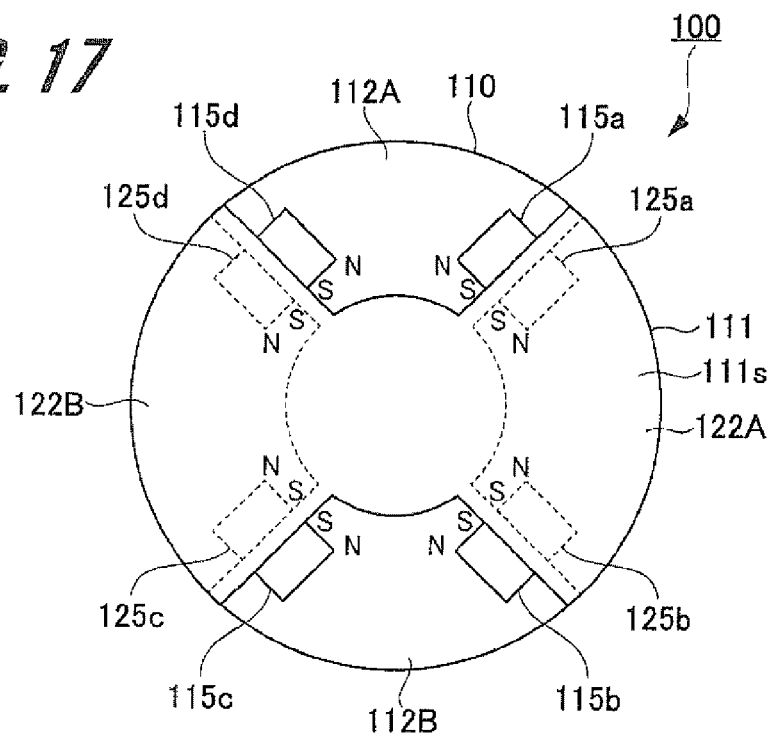
FIG. 17 is an explanatory view illustrating a positional relationship between first magnets provided on the first rotating member and second magnets provided on the second rotating member.

FIG. 17 is an explanatory view illustrating a positional relationship between the first magnets provided on the first rotating member 110 and the second magnets provided on the second rotating member 120. FIG. 17 is an I-I line arrow view of a state (FIG. 13) in which the first rotating member 110 and the second rotating member 120 are combined.

In the state in which the first rotating member 110 and the second rotating member 120 are combined, the first magnet 115a of the first rotating member 110 and the second magnet 125a of the second rotating member 120 face each other similarly to the example in FIG. 1. Moreover, the first magnet 115b and the second magnet 125b, the first magnet 115c and the second magnet 125c, and the first magnet 115d and the second magnet 125d face each other, respectively. That is, in the first rotating member 110 and the second rotating member 120, the four first magnets 115 and the corresponding four second magnets 125 face each other with an interval of 90 degrees.

The first magnets 115 and the second magnets 125 are preferably held by the first rotating member 110 and the second rotating member 120 so that the facing surfaces of the first magnets 115 and the second magnets 125 become substantially parallel with each other when the first magnets 115 and the second magnets 125 come close to and face each other. As an example, the technology for forming the taper exemplified in FIG. 9 may be applied to the first holding portions 121A and 121B and the second holding portions 122A and 122B.

In the non-contact power transmission apparatus 100, the magnetic pole of the first magnet 115 on the side facing the second magnet 125 and the magnetic pole of the second magnet 125 on the side facing the first magnet 115 are arranged so as to have the same pole. In FIG. 17, the S-poles of the magnets face each other. A permanent magnet is used as an example for the first magnet 115 and the second magnet 125. A shape of each of the first magnet 115 and the second magnet 125 may be circular, columnar or square, for example, other than annular.

In such configuration, the electric motor 104 is driven, and power (rotary torque) is given to the first rotating shaft 103 of the first member 101 so as to rotate the first rotating member 110. When the first magnet 115 of the first rotating member 110 and the second magnet 125 of the second rotating member 120 come close to and face each other, a repulsion force is generated between the first magnet 115 and the second magnet 125 similarly to the first to third embodiments. As a result, a force in the same direction as the rotating direction of the first rotating member 110 acts on the second rotating member 120 holding the second magnet 125. As a result, the second rotating shaft 105 coupled to the second rotating member 120 rotates. As described above, the power (rotary torque) of the first member 1 is transmitted to the second member 2 in a non-contact manner using magnetism.

The embodiment exerts the effect similar to those of the first to third embodiments. That is, in the embodiment, the first rotating member 110 attached to the first rotating shaft 103 (driving shaft) and the second rotating member 120 attached to the second rotating shaft 105 (driven shaft) are joined in a non-contact manner without interposing a component for coupling such as rubber, resin or metal therebetween. As a result, power is efficiently transmitted from the driving shaft to the driven shaft between the coupled first rotating member 110 and second rotating member 120 without generating friction or vibration.

In the embodiment, the first rotating member 110 is configured to be provided with the two first holding portions each holding the first magnet, but the number of the first holding portions may be one or three or more. If the three first holding portions are provided on the first rotating member 110, for example, they are arranged at an interval of 120 degrees. Similarly, the number of the second holding portions of the second rotating member 120 may be one or three or more.

Moreover, the first rotating member 110 may be configured such that the first rotating member main body 111 and the first holding portions 112A and 112E are made separate bodies, and the first holding portions 112A and 112B are fixed to the first rotating member main body 111 by known means. The same applies to the second rotating member 120.

First Variation of Fourth Embodiment

Figure 18:
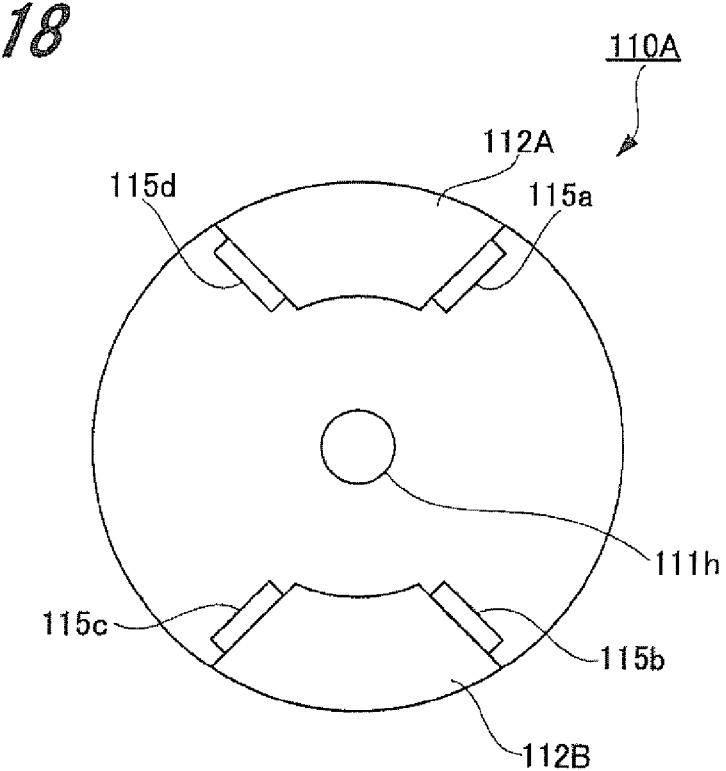
FIG. 18 is an explanatory view illustrating a first variation of a non-contact power transmission apparatus according to the fourth embodiment of the present invention.

FIG. 18 is an explanatory view illustrating a first variation of the non-contact power transmission apparatus 100 according to the fourth embodiment.

The non-contact power transmission apparatus 100 (FIG. 16A) accommodates the first magnets 115 in the hole portions 116 of the first holding portions 112A and 112E of the first rotating member 110. On the other hand, in a first rotating member 110A according to the first variation, the hole portions 116 of the first holding portions 112A and 112B of the first rotating member 110 are eliminated, and the first magnets 115 are held on the surfaces of the first holding portions 112A and 112B. For example, the first magnets 115 are fixed to the surfaces of the first holding portions 112A and 112B by using an adhesive. For the second rotating member, too, the second magnets 125 are similarly held on the surfaces of the second holding portions 122A and 122B.

Second Variation of Fourth Embodiment

Figure 19:
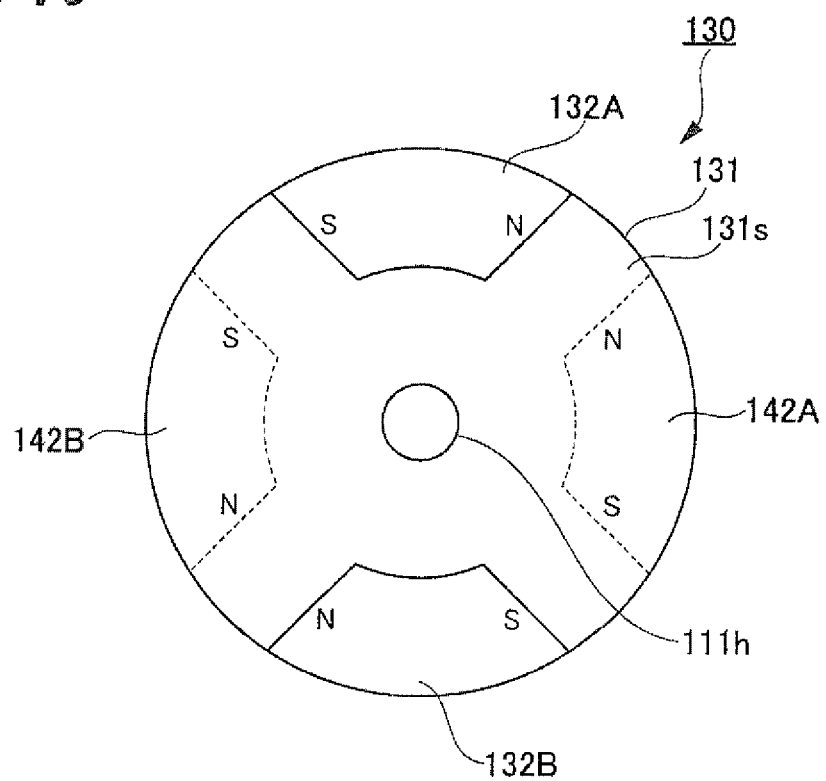
FIG. 19 is an explanatory view illustrating a second variation of the non-contact power transmission apparatus according to the fourth embodiment of the present invention.

FIG. 19 is an explanatory view illustrating a second variation of the non-contact power transmission apparatus 100 according to the fourth embodiment.

In a first rotating member 130 according to the second variation, projecting portions constituted having the same shape as the first holding portions 112A and 112B of the first rotating member 110, respectively, and made of a magnet are formed on a main surface 131s of a first rotating member main body 131. That is, the projecting portions are the first magnets 132A and 132B. The first rotating member main body 131 is constituted integrally with the first magnets 132A and 132B. Moreover, a second rotating member, not shown, corresponding to the first rotating member 130 has second magnets 142A and 142B similarly constituted integrally with a second rotating member main body.

As illustrated in FIG. 19, magnet poles of the first magnets 132A and 132B on the side facing the second magnets 142A and 142B and magnet poles of the second magnets 142A and 142B on the side facing the first magnets 132A and 132B are arranged so as to have the same pole.

By means of the above described configuration, when the first magnets 132A and 132B of the first rotating member 130 and the second magnets 142A and 142B of the second rotating member come close to and face each other, a repulsion force is generated between the first magnets 132A and 132B and the second magnets 142A and 142B. By using it, power (rotary torque) of the first member having the first magnets 132A and 132B is transmitted to the second member having the second magnets 142A and 142B in a non-contact manner by using magnetism similarly to the first to fourth embodiments.

A permanent magnet can be used as means for polarizing the magnetic poles of the first magnets 132A and 132B and the second magnets 142A and 142B. Alternatively, an electromagnet may be used instead of the permanent magnet.

The present invention is not limited to the above described embodiments but includes other variations and application examples as long as the gist of the present invention described in claims is not departed.

For example, the above described embodiments explain the present invention in detail to be easily understood and are not necessarily intended to those provided with all the configurations explained above. Moreover, a part of the configuration of any one of the embodiments can be replaced with the configuration of the other embodiments or the configuration of another embodiment can be added to the configuration of any one of the embodiments. Furthermore, addition/replacement or deletion of another configuration can be applied to a part of the configuration of each of the embodiments.

For example, in the above described first to fourth embodiments, the first member is explained as the driving side and the second member as the driven side, but the second member may be used as the driving side and the first member as the driven side.

Moreover, if the non-contact power transmission apparatus according to the first to third embodiments is applied to a power storage apparatus, a magnetic fluid is suitably used so as to seal a gap between a vacuum container and the first rotating shaft (or the second rotating shaft).

What is claimed is:

1. A non-contact power transmission apparatus comprising:
   a first member including:
      a first rotating shaft which is driven to rotate;
      a first disk-shaped member which is coupled to the first rotating shaft to rotate;
      a first plate-shaped member provided on a first surface of the first disk-shaped member on a side opposite to a second surface to which the first rotating shaft is coupled, the first plate-shaped member having a surface perpendicular to the first surface; and
      a first magnet provided on the perpendicular surface of the first plate-shaped member;
   a second member including:
      a second rotating shaft which is driven to rotate;
      a second disk-shaped member provided so as to face the first disk-shaped member and coupled to the second rotating shaft to rotate;
      a second plate-shaped member provided on a first surface of the second disk-shaped member on a side opposite to a second surface to which the second rotating shaft is coupled, the second plate-shaped member having a surface perpendicular to the first surface; and
      a second magnet provided on the perpendicular surface of the second plate-shaped member; and
   a magnetic pole of the first magnet on a side facing the second magnet and a magnetic pole of the second magnet on a side facing the first magnet have the same pole,
   wherein the first member is provided with a support portion main body configured to support the first plate-shaped member provided on the first surface of the first disk-shaped member on the side opposite to the second surface to which the first rotating shaft is coupled and provided at a center part on the first surface of the first disk-shaped member, the first plate-shaped member has a first end portion at a first side and a second end portion at a second side, the first end portion is closer to the first rotating shaft than the second end portion, a vicinity of the first end portion is coupled to the support portion main body, and the first magnet provided on the first plate-shaped member is arranged on the second side.

2. The non-contact power transmission apparatus according to claim 1, wherein
   when the first rotating shaft of the first member rotates, the first disk-shaped member rotates around the first rotating shaft, and the first magnet provided on the first plate-shaped member of the first disk-shaped member and the second magnet provided on second plate-shaped member of the second disk-shaped member come close to and face each other, a repulsion force is generated between the first magnet and the second magnet.

3. The non-contact power transmission apparatus according to claim 1, wherein
   the first plate-shaped member is arranged along a radiation direction around the first rotating shaft; and
   the second plate-shaped member is arranged along a radiation direction around the second rotating shaft.

4. The non-contact power transmission apparatus according to claim 1, wherein
   a taper is formed on a surface of the second plate-shaped member facing the first plate-shaped member so that, when the first magnet and the second magnet come close to and face each other, the surface of the first magnet facing the second magnet and the surface of the second magnet facing the first magnet become parallel with each other.

5. The non-contact power transmission apparatus according to claim 1, wherein
   the first plate-shaped member has a through hole formed on a side closer to the first rotating shaft than the first magnet, perpendicularly to the first rotating shaft, an insertion portion of a fixing member to be fixed to the support portion main body is inserted into the through hole, and an annular reinforcing member is wound around an outer periphery of the first plate-shaped member.

6. The non-contact power transmission apparatus according to claim 5, wherein the annular reinforcing member is constituted by a composite material in which at least carbon fiber, glass fiber or para-based wholly aromatic polyamide fiber is consolidated by a resin.

7. The non-contact power transmission apparatus according to claim 1, wherein the second disk-shaped member has a first cylindrical portion provided in a vicinity of an outer peripheral portion of the first surface of the second disk-shaped member so as to extend in a perpendicular direction from the first surface, and the second plate-shaped member is fixed to the first surface of the second disk-shaped member and an inner peripheral surface of the first cylindrical portion.

8. The non-contact power transmission apparatus according to claim 7, wherein the second disk-shaped member has a second cylindrical portion arranged on an outside of the first cylindrical portion in close contact with the first cylindrical portion.

* * * * *